United States Patent
Kavantzas et al.

(10) Patent No.: US 9,003,478 B2
(45) Date of Patent: Apr. 7, 2015

(54) ENFORCEMENT OF CONDITIONAL POLICY ATTACHMENTS

(75) Inventors: Nickolas Kavantzas, Emerald Hills, CA (US); Jeffrey Jason Bryan, Mountain House, CA (US); Cecilia Zhao, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 253 days.

(21) Appl. No.: 13/596,545

(22) Filed: Aug. 28, 2012

(65) Prior Publication Data

US 2013/0086184 A1     Apr. 4, 2013

Related U.S. Application Data

(63) Continuation of application No. 13/436,933, filed on Mar. 31, 2012.

(60) Provisional application No. 61/541,450, filed on Sep. 30, 2011.

(51) Int. Cl.
*H04L 29/06*     (2006.01)
*H04L 12/24*     (2006.01)

(52) U.S. Cl.
CPC ............. *H04L 63/10* (2013.01); *H04L 41/0246* (2013.01); *H04L 63/20* (2013.01); *H04L 41/0873* (2013.01)

(58) Field of Classification Search
CPC ........................................................ H04L 63/10
USPC ................................................................ 726/1
See application file for complete search history.

(56) References Cited

U.S. PATENT DOCUMENTS

| | | | |
|---|---|---|---|
| 5,797,128 | A | 8/1998 | Birnbaum |
| 5,889,953 | A | 3/1999 | Thebaut et al. |
| 6,064,656 | A | 5/2000 | Angal et al. |
| 6,167,445 | A | 12/2000 | Gai et al. |
| 6,516,416 | B2 | 2/2003 | Gregg et al. |

(Continued)

OTHER PUBLICATIONS

Ion et al., Extending the Java Virtual Machine to Enforce Fine-Grained Security Policies in Mobile Devices, Dec. 2007, Twenty-Third Annual Computer Security Applications Conference, pp. 233-242.*

(Continued)

*Primary Examiner* — Morshed Mehedi
*Assistant Examiner* — Kenneth Chang
(74) *Attorney, Agent, or Firm* — Kilpatrick Townsend & Stockton LLP

(57) ABSTRACT

Framework for conditionally attaching web service policies to a policy subject (e.g., a web service client or service endpoint) at subject runtime. In one set of embodiments, a constraint expression can be defined that specifies one or more runtime conditions under which a policy should be attached to a policy subject. The constraint expression can be associated with the policy and the policy subject via policy attachment metadata. The constraint expression can then be evaluated at runtime of the policy subject to determine whether attachment of the policy to the policy subject should occur. If the evaluation indicates that the policy should be attached, the attached policy can be processed at the policy subject (e.g., enforced or advertised) as appropriate. Using these techniques, the policy subject can be configured to dynamically exhibit different behaviors based on its runtime context.

19 Claims, 10 Drawing Sheets

(56) References Cited

U.S. PATENT DOCUMENTS

| | | |
|---|---|---|
| 6,578,076 B1 | 6/2003 | Putzolu |
| 6,944,183 B1 | 9/2005 | Iyer et al. |
| 6,952,728 B1 | 10/2005 | Alles et al. |
| 7,197,741 B1 | 3/2007 | Stapf |
| 7,213,068 B1 | 5/2007 | Kohli et al. |
| 7,290,288 B2 | 10/2007 | Gregg et al. |
| 7,350,204 B2 | 3/2008 | Lambert et al. |
| 7,424,702 B1 | 9/2008 | Vinodkrishnan et al. |
| 7,478,419 B2 | 1/2009 | Anderson et al. |
| 7,725,605 B2 | 5/2010 | Palmeri et al. |
| 7,796,760 B2 | 9/2010 | Brettle et al. |
| 7,855,972 B2 | 12/2010 | Pettit et al. |
| 7,877,264 B2 | 1/2011 | Fox et al. |
| 8,156,538 B2 | 4/2012 | Kanade et al. |
| 8,265,969 B2 | 9/2012 | Comstock et al. |
| 8,307,413 B2 | 11/2012 | Smadja et al. |
| 8,560,819 B2 | 10/2013 | Fillipi et al. |
| 2002/0124067 A1* | 9/2002 | Parupudi et al. ............ 709/223 |
| 2002/0143914 A1* | 10/2002 | Cihula ........................ 709/223 |
| 2003/0115179 A1 | 6/2003 | Prabakaran et al. |
| 2003/0115484 A1 | 6/2003 | Moriconi et al. |
| 2003/0229501 A1* | 12/2003 | Copeland et al. .................. 705/1 |
| 2004/0039594 A1 | 2/2004 | Narasimhan et al. |
| 2004/0103046 A1 | 5/2004 | Christoph et al. |
| 2004/0189708 A1 | 9/2004 | Larcheveque et al. |
| 2005/0080914 A1 | 4/2005 | Lerner et al. |
| 2005/0086197 A1 | 4/2005 | Boubez et al. |
| 2005/0091352 A1 | 4/2005 | Alex et al. |
| 2005/0223109 A1* | 10/2005 | Mamou et al. ................ 709/232 |
| 2006/0041565 A1* | 2/2006 | Cuomo et al. ................ 707/100 |
| 2006/0053120 A1 | 3/2006 | Shum et al. |
| 2006/0075465 A1 | 4/2006 | Ramanathan et al. |
| 2006/0088276 A1 | 4/2006 | Cho et al. |
| 2006/0089938 A1 | 4/2006 | Leonard et al. |
| 2006/0117063 A1 | 6/2006 | Havewala et al. |
| 2006/0206440 A1 | 9/2006 | Anderson et al. |
| 2006/0230430 A1 | 10/2006 | Hondo et al. |
| 2006/0282876 A1* | 12/2006 | Shelest et al. ...................... 726/1 |
| 2007/0006278 A1 | 1/2007 | Ioan Avram et al. |
| 2007/0157287 A1 | 7/2007 | Lim |
| 2007/0266032 A1 | 11/2007 | Blumenau |
| 2007/0266422 A1* | 11/2007 | Germano et al. .................. 726/1 |
| 2007/0282879 A1 | 12/2007 | Degenkolb et al. |
| 2008/0046961 A1 | 2/2008 | Pouliot |
| 2008/0066189 A1 | 3/2008 | Liu et al. |
| 2008/0071805 A1 | 3/2008 | Mourra et al. |
| 2008/0091682 A1 | 4/2008 | Lim |
| 2008/0148345 A1 | 6/2008 | Rubio |
| 2008/0155641 A1 | 6/2008 | Beavin et al. |
| 2008/0184201 A1 | 7/2008 | Burns et al. |
| 2008/0189760 A1 | 8/2008 | Rosenberg et al. |
| 2008/0225748 A1 | 9/2008 | Khemani et al. |
| 2008/0244692 A1 | 10/2008 | Chang |
| 2008/0244693 A1 | 10/2008 | Chang |
| 2008/0256593 A1 | 10/2008 | Vinberg et al. |
| 2008/0288651 A1* | 11/2008 | Brauel et al. .................. 709/230 |
| 2008/0301757 A1 | 12/2008 | Demarest et al. |
| 2009/0070853 A1* | 3/2009 | Chung et al. ...................... 726/1 |
| 2009/0099860 A1 | 4/2009 | Karabulut et al. |
| 2009/0099882 A1 | 4/2009 | Karabulut |
| 2009/0125612 A1 | 5/2009 | Rabetge et al. |
| 2009/0150824 A1 | 6/2009 | Furuichi |
| 2009/0177929 A1 | 7/2009 | Sijelmassi |
| 2009/0193057 A1 | 7/2009 | Maes |
| 2009/0205013 A1 | 8/2009 | Lowes |
| 2009/0281996 A1 | 11/2009 | Liu et al. |
| 2010/0030890 A1 | 2/2010 | Dutta et al. |
| 2010/0064184 A1 | 3/2010 | Almeida et al. |
| 2010/0077455 A1 | 3/2010 | Nishio et al. |
| 2010/0100810 A1 | 4/2010 | Nakamura et al. |
| 2010/0115075 A1 | 5/2010 | Chen et al. |
| 2010/0125477 A1 | 5/2010 | Mousseau et al. |
| 2010/0125665 A1 | 5/2010 | Simpson et al. |
| 2010/0153695 A1 | 6/2010 | Bussard et al. |
| 2010/0235915 A1 | 9/2010 | Memon et al. |
| 2010/0269148 A1 | 10/2010 | Almeida et al. |
| 2010/0281455 A1 | 11/2010 | Anand et al. |
| 2010/0281516 A1 | 11/2010 | Lerner et al. |
| 2011/0035650 A1 | 2/2011 | Jardine-Skinner et al. |
| 2011/0047451 A1 | 2/2011 | Jardine-Skinner et al. |
| 2011/0131275 A1 | 6/2011 | Maida-Smith et al. |
| 2011/0302239 A1 | 12/2011 | Grateau et al. |
| 2011/0321122 A1 | 12/2011 | Mwangi et al. |
| 2012/0054496 A1 | 3/2012 | Abeln et al. |
| 2012/0102182 A1 | 4/2012 | Voskuil et al. |
| 2012/0110093 A1 | 5/2012 | Tingstrom et al. |
| 2012/0131164 A1 | 5/2012 | Bryan et al. |
| 2012/0216100 A1 | 8/2012 | Jardine-Skinner et al. |
| 2013/0262646 A1 | 10/2013 | Fiebig et al. |

OTHER PUBLICATIONS

Non-Final Office Action for U.S. Appl. No. 14/026,767 (Mar. 4, 2014) 7 pages.

Non-Final Office Action for U.S. Appl. No. 13/596,861 (Apr. 10, 2014) 28 pages.

Advisory Action for U.S. Appl. No. 13/436,940 (Apr. 22, 2014) 5 pages.

Notice of Allowance for U.S. Appl. No. 13/118,944 (Oct. 10, 2013) 9 pages.

Notice of Allowance for U.S. Appl. No. 13/118,876 (Jun. 12, 2013) 8 pages.

Notice of Allowance for U.S. Appl. No. 13/118,940 (Jan. 15, 2014) 5 pages.

Final Office Action for U.S. Appl. No. 13/436,940 (Jan. 28, 2014) 21 pages.

Non-Final Office Action for U.S. Appl. No. 13/436,933 (Feb. 20, 2014) 24 pages.

Non-Final Office Action for U.S. Appl. No. 13/116,947 (Jun. 20, 2014) 31 pages.

Non-Final Office Action for U.S. Appl. No. 13/596,525 (May 30, 2014) 15 pages.

Non-Final Office Action for U.S. Appl. No. 13/596,891 (Apr. 25, 2014) 10 pages.

Non Final Office Action for U.S. Appl. No. 13/149,037 (May 1, 2013), 8 pages.

Non Final Office Action for U.S. Appl. No. 13/118,944 (May 16, 2013), 30 pages.

Shute, et al., "DataPower SOA Appliance Service Planning, Implementation, and Best Practices," IBM Redbook, SG24-7943-00, Jun. 28, 2011.

Nordbotten, N.A., "XML and Web Services Security Standards," Communications Surveys & Tutorials, IEEE, vol. 11, No. 3, pp. 4,21, 3rd Quarter 2009.

Final Office Action for U.S. Appl. No. 13/149,065 (Jul. 3, 2013), 20 pages.

Non Final Office Action for U.S. Appl. No. 13/436,940 (Jul. 15, 2013), 30 pages.

Final Office Action for U.S. Appl. No. 13/118,940 (Aug. 29, 2013) 10 pages.

Notice of Allowance for U.S. Appl. No. 13/149,049 (Sep. 17, 2013) 10 pages.

Notice of Allowance for U.S. Appl. No. 13/149,037 (Oct. 8, 2013) 7 pages.

Non Final Office Action for U.S. Appl. No. 13/118,940 (Feb. 13, 2013). 9 pages.

Non Final Office Action for U.S. Appl. No. 13/149,049 (Mar. 5, 2013). 14 pages.

Non Final Office Action for U.S. Appl. No. 13/149,065 (Dec. 4, 2012).

Bajaj et al. "Web Services Policy Framework (WS-Policy)" Version 1.2, BEA Systems, Inc. (Mar. 2006).

Christensen et al. "Web Services Description Language (WSDL)" version 1.1, World Wide Web Consortium (Mar. 2001).

Phan et al. "Quality-Driven Business Policy Specifications and Refinement for Service-Oriented Systems," Proceedings of the 6th International Conference on Service-Oriented Computing (ICSOC 2008) 5364:5-21 (2008).

(56) References Cited

OTHER PUBLICATIONS

Non-Final Office Action for U.S. Appl. No. 13/149,065 (Jul. 14, 2014) 23 pages.
Non-Final Office Action for U.S. Appl. No. 14/106,037 (Jul. 16, 2014), 16 pages.
Notice of Allowance for U.S. Appl. No. 13/436,940 (Aug. 12, 2014), 13 pages.
Final Office Action for U.S. Appl. No. 13/436,933 (Aug. 29, 2014), 28 pages.
Final Office Action for U.S. Appl. No. 13/596,891(Oct. 2, 2014), 11 pages.
Final Office Action for U.S. Appl. No. 13/596,861 (Oct. 3, 2014), 30 pages.
Notice of Allowance for U.S. Appl. No. 14/106,037 Oct. 24, 2014), 9 pages.
Notice of Allowance for U.S. Appl. No. 14/026,767 (Sep. 8, 2014) 9 pages.
Final Office Action for U.S. Appl. No. 13/596,525 (Nov. 26, 2014) 15 pages.
Notice of Allowance for U.S. Appl. No. 13/149,065 (Dec. 29, 2014) 10 pages.
Final Office Action for U.S. Appl. No. 13/118,947 (Jan. 15, 2015) 32 pages.

* cited by examiner

ENFORCEMENT OF CONDITIONAL POLICY ATTACHMENTS

CROSS-REFERENCES TO RELATED APPLICATIONS

This application is a continuation of U.S. application Ser. No. 13/436,933, filed Mar. 31, 2012,, which claims the benefit under 35 U.S.C. 119(e) of U.S. Provisional Application No. 61/541,450,, filed Sep. 30, 2011. The entire contents of the 61/541,450 and Ser. No. 13/436,933, applications are incorporated herein by reference for all purposes.

BACKGROUND

Companies worldwide are actively deploying service-oriented architecture (SOA) infrastructures using web services, both in intranet and extranet environments. While web services offer many advantages over traditional alternatives (e.g., distributed objects or custom software), deploying large networks of interconnected web services can still present several challenges, particularly with respect to security and management.

Some existing SOA middleware solutions have addressed these challenges via the implementation of a policy-based security/management model. For example, Oracle Corporation's Oracle Web Services Manager (OWSM) enables companies to centrally define and store declarative policy documents (referred to herein as web service policies or policies) that describe security and/or management-related behaviors for web service clients and services in an SOA infrastructure. Each policy can be attached to one or more web service client/service endpoints (referred to herein as policy subjects) hosted by one or more SOA applications. The attached policies can then be enforced at the client/service endpoints through configurable agents. With this model, security/management logic does not need to be hardcoded into an SOA application. Rather, such logic can be externalized in the form of a declarative web service policy, which can then be attached to an endpoint/application as needed by modifying metadata (referred to herein as policy attachment metadata) associated with the endpoint/application.

In certain implementations, policies can be attached to specific client/service endpoints via "local" policy attachment metadata, and/or to all endpoints that fall within a predefined scope (e.g., domain, server, application, etc.) of an SOA deployment via "global" policy attachment metadata. The latter approach can be useful in large deployments, since it enables a policy to be attached to a multitude of policy subjects in an efficient and consistent manner. Additional information regarding global policy attachments can be found in U.S. patent application Ser. No. 13/118,947, filed May 31, 2011, and entitled "ATTACHING WEB SERVICE POLICIES TO A GROUP OF POLICY SUBJECTS," which is incorporated herein by reference in its entirety for all purposes.

One shortcoming with existing policy-based SOA solutions is that there is no way to conditionally attach policies to a particular policy subject at runtime. Instead, all valid policies that are associated with the policy subject via local or global policy attachment metadata will be considered attached (and thus will be enforced) at subject runtime, regardless of the context in which the policy subject is invoked/executed. This can be limiting in several scenarios.

By way of example, consider a situation where an application server is hosting a web service that is accessible by a first set of clients residing on an internal, secure network and a second set of clients residing on an external, insecure network. Access via the external network is through a firewall. Since physical access to the internal network is highly restricted, it may be desirable for the web service to enforce a less secure security policy (e.g., authentication and authorization required, but no message protection required) for requests originating from the internal clients. This will reduce the load on the server and increase performance. At the same time, it may be desirable for the web service to enforce a more secure security policy (e.g., authentication, authorization, and message protection required) for requests originating from the external clients. Unfortunately, this type of per-request, conditional processing cannot be achieved with existing SOA solutions. At best, a system administrator could manually modify the policy attachment metadata for the web service to attach one policy or the other in anticipation of receiving requests from internal or external clients. However, this manual approach is cumbersome and would not be feasible in scenarios where a large number of internal and external clients are accessing the service at substantially the same time.

BRIEF SUMMARY

Embodiments of the present invention provide a framework for conditionally attaching web service policies to a policy subject (e.g., a web service client or service endpoint) at subject runtime.

In one set of embodiments, a constraint expression can be defined that specifies one or more runtime conditions under which a policy should be attached to a policy subject. The constraint expression can be associated with the policy and the policy subject via policy attachment metadata. The constraint expression can then be evaluated at runtime of the policy subject to determine whether attachment of the policy to the policy subject should occur. If the evaluation indicates that the policy should be attached, the attached policy can be processed at the policy subject (e.g., enforced or advertised) as appropriate. Using these techniques, the policy subject can be configured to dynamically exhibit different behaviors based on its runtime context, without having to manually modify the subject's source code or metadata each time a change in behavior is desired.

In a further set of embodiments, a validation process can be performed at a policy subject prior to runtime (e.g., during an initialization phase) to ensure that there are no validation errors with respect to the web service policies that may be conditionally attached to the subject. This validation process can include grouping the policies that have been associated with the policy subject (via policy attachment metadata) by their corresponding constraint expressions, and determining which groups can potentially overlap (i.e., be simultaneously attached to the policy subject) at runtime. Each set of overlapping groups can then be validated using a predefined set of validation rules to identify potential errors pertaining to the policies in the set. If a validation error is found, information regarding the error can be provided to a system administrator for review, or can be stored for later use/processing.

According to one set of embodiments of the present invention, policy attachment metadata can be retrieved that identifies a web service policy and a policy subject, where the policy attachment metadata indicates that the web service policy should be attached to the policy subject. In addition, a constraint expression can be received or selected by a user, where the constraint expression is configured to return a Boolean result, and where the constraint expression is dependent on at least one parameter whose value is only available at runtime of the policy subject. The policy attachment metadata can then be modified to include a reference to the constraint expression, where the modified policy attachment metadata indicates that the web service policy should be attached to the policy subject only if the constraint expression is satisfied at runtime of the policy subject.

In one embodiment, the modified policy attachment metadata can further indicate that the web service policy should not be attached to the policy subject if the constraint expression is not satisfied at runtime of the policy subject.

In one embodiment, the policy subject can be a web service endpoint.

In one embodiment, the at least one parameter can correspond to a transport-level characteristic of a request message received at runtime of the policy subject, such as the value of an HTTP header in the request message. The HTTP header can be a header that identifies an originator of the request message, such as a virtual host type header.

In one embodiment, the at least one parameter can correspond to a payload characteristic of a request message received at runtime of the policy subject, such as a user identified included in the message payload.

In one embodiment, the at least one parameter can correspond to a system-level characteristic of an application server configured to execute the policy subject, such as a system performance or configuration metric/statistic.

In one embodiment, the constraint expression can comprise a single Boolean function. In another embodiment, the constraint expression can comprise a plurality of Boolean functions joined by one or more logical operators. In another embodiment, the constraint expression can comprise one or more special characters, such as parentheses, to collect functions into a group, and the special characters can increase a precedence level of the group in the expression.

In one embodiment, the web service policy can comprise one or more policy assertions conforming to WS-SecurityPolicy.

In one embodiment, the policy attachment metadata can be stored as an Extensible Markup Language (XML) file, and the web service policy and the policy subject can be identified via separate XML elements in the XML file.

In one embodiment, modifying the policy attachment metadata can comprise inserting a new XML attribute within the XML element identifying the policy subject, where the new XML attribute identifies the reference to the constraint expression.

According to another set of embodiments of the present invention, the occurrence of a runtime event at a web service endpoint can be detected. In response to the detection, a runtime context component can be updated based on the runtime event, where the runtime context component specifies a set of data regarding a current runtime context of the web service endpoint. In addition, a determination can be made, based on the runtime context component and an association between a web service policy and a constraint expression, whether the web service policy should be attached to the web service endpoint. The constraint expression can be dependent on one or more runtime values specified in the runtime context component, and the determination can comprise evaluating the constraint expression in view of the one or more runtime values. If the web service policy should be attached to the web service endpoint, the web service policy can be enforced at the web service endpoint with respect to the detected runtime event.

In one embodiment, the runtime event can be the reception of an incoming request message at the web service endpoint.

In one embodiment, updating the runtime context component can comprise extracting one or more pieces of data from the incoming message and updating the runtime context component with the extracted pieces of data.

In one embodiment, the one or more pieces of data can include an HTTP header of the incoming message, and identification of a sender of the incoming message, or a portion of a payload of the incoming message.

In one embodiment, the one or more runtime values can include a transport-level characteristic of the incoming message, a payload characteristic of the incoming message, or a system-level characteristic of an application server hosting the web service endpoint.

In one embodiment, a transport-level characteristic of the incoming message can include an HTTP header of the incoming message.

In one embodiment, a payload characteristic of the incoming message can include an identification of a user associated with the incoming message.

In one embodiment, a system-level characteristic of the application server can include a server configuration and/or performance metric/statistic.

In one embodiment, the constraint expression can be a Boolean expression comprising a set of one or more Boolean functions grouped by zero or more logical operators.

In one embodiment, the web service policy can comprise a set of assertions, and enforcing the web service policy can comprise enforcing each assertion in the set of assertions.

In one embodiment, the set of assertions can relate to security or management-related behaviors of the web service endpoint, such as user authentication or authorization.

In one embodiment, if the web service policy should not be attached to the web service endpoint, the web service policy can be ignored with respect to the detected runtime event.

In one embodiment, the web service endpoint can correspond to a port of a Service-Oriented Architecture (SOA) application.

According to another set of embodiments of the present invention, the reception of a Web Service Definition Language (WSDL) request at a web service endpoint can be detected. In response to the detection, a determination can be made, based on a runtime context component and an association between a web service policy and a constraint expression, whether the web service policy should be attached to the web service endpoint. The constraint expression can be dependent on one or more runtime values specified by the runtime context component, and the determination can comprise evaluating the constraint expression in view of the one or more runtime values. If the web service policy should be attached to the web service endpoint, a WSDL file can be generated based on the web service policy, and the WSDL file can be transmitted to an originator of the WSDL request.

In one embodiment, the runtime context component can specify a set of data regarding a current runtime context of the web service endpoint.

In one embodiment, the generated WSDL file can be stored in a cache, where the WSDL file is indexed in the cache using a key based on the current runtime context. In addition, the reception of a second WSDL request at the web service endpoint can be detected, where the second WSDL request being received under a runtime context identical to the runtime context of the initial WSDL request, the WSDL file stored in the cache can be retrieved using the key, and the retrieved WSDL file can be transmitted to an originator of the second WSDL request.

In one embodiment, the WSDL request can correspond to an invocation of a Uniform Resource Locator (URL) associated with the web service endpoint.

In one embodiment, the one or more runtime values can include a transport-level characteristic of the WSDL request (e.g., HTTP header) or a system-level characteristic of an application server hosting the web service endpoint (e.g., server performance or configuration metric/statistic).

In one embodiment, generating the WSDL file can comprise identifying a set of assertions included in the web service policy, transforming each assertion in the set of assertions into a WSDL representation, and packaging the transformed assertions into the WSDL file.

In one embodiment, the web service endpoint can correspond to a port of a Service-Oriented Architecture (SOA) application.

According to another set of embodiments of the present invention, a runtime policy set for a web service endpoint can be generated, where the runtime policy set identifies a list of all web service policies that can be attached to the web service endpoint and, for each web service policy, a corresponding constraint expression. In addition, the web service policies included in the runtime policy set can be aggregated into a set of groups, where the aggregating is performed by constraint expression, and one or more groups in the set of groups that will be simultaneously attached to the web service endpoint at runtime can be identified. One or more validation rules can then be applied to the web service policies in the one or more groups.

In one embodiment, a set of validation errors can be stored that are generated as a result of applying the one or more validation rules. The validation errors can then be made available to a user for review. Alternatively, one or more errors in the set of validation errors can be thrown at runtime of the web service endpoint.

In one embodiment, the identifying the one or more groups can comprise analyzing constraint expressions linked with the one or more groups and determining that the constraint expressions can be satisfied under a single runtime context.

In one embodiment, applying the one or more validation rules can comprise parsing each web service policy in the one or more groups to determine one or more assertions included in the web service policy, and applying the one or more validation rules to each assertion in the one or more assertions.

In one embodiment, the one or more validation rules can include a rule that limits attachment of a web service policy to policy subjects of a certain type, a rule that limits ordering of certain web service policies, or a rule that indicates certain web service policy types are incompatible.

In one embodiment, the one or more validation rules can be predefined and seeded by an application developer.

In one embodiment, the one or more validation rules can be customizable.

In one embodiment, the generating, aggregating, identifying, and applying steps can be performed during an initialization phase of a Service-Oriented Architecture (SOA) application hosting the web service endpoint. In an alternative embodiment, they can be performed at a time of defining, in the form of policy attachment metadata, one or more associations between the web service endpoint and one or more web service policies.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Embodiments of the present invention provide a framework for conditionally attaching web service policies to a policy subject (e.g., a web service client or service endpoint) at subject runtime. In one set of embodiments, a constraint expression can be defined that specifies one or more runtime conditions under which a policy should be attached to a policy subject. The constraint expression can be associated with the policy and the policy subject via policy attachment metadata. The constraint expression can then be evaluated at runtime of the policy subject to determine whether attachment of the policy to the policy subject should occur. If the evaluation indicates that the policy should be attached, the attached policy can be processed at the policy subject (e.g., enforced or advertised) as appropriate. Using these techniques, the policy subject can be configured to dynamically exhibit different behaviors based on its runtime context, without having to manually modify the subject's source code or metadata each time a change in behavior is desired.

In a further set of embodiments, a validation process can be performed at a policy subject prior to runtime (e.g., during an initialization phase) to ensure that there are no validation errors with respect to the web service policies that may be conditionally attached to the subject. This validation process can include grouping the policies that have been associated with the policy subject (via policy attachment metadata) by their corresponding constraint expressions, and determining which groups can potentially overlap (i.e., be simultaneously attached to the policy subject) at runtime. Each set of overlapping groups can then be validated using a predefined set of validation rules to identify potential errors pertaining to the policies in the set. If a validation error is found, information regarding the error can be provided to a system administrator for review, or can be stored for later use/processing.

System Overview

Figure 1:
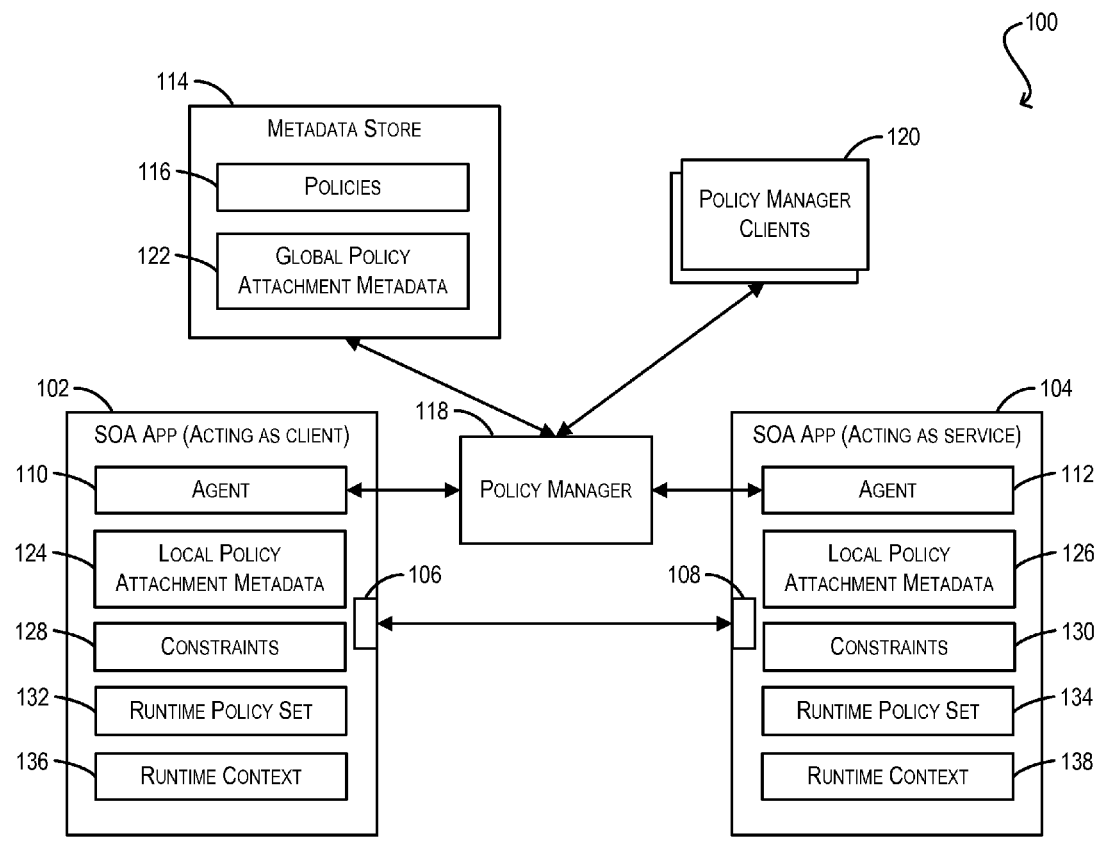
FIG. 1 is a simplified block diagram of a system in accordance with an embodiment of the present invention.

FIG. 1 is a simplified block diagram of a policy-based SOA system 100 according to an embodiment of the present invention. As shown, system 100 can include an SOA application 102 configured to act as a web service client and an SOA application 104 configured to act as a web service. In various embodiments, SOA application 102 can send, via a web service (WS) client endpoint 106 (e.g., a port of application 102), a request message to SOA application 104 to invoke a service operation exposed by application 104. The request message can be expressed using a standard web services communication protocol, such as Simple Object Access Protocol (SOAP). SOA application 104 can receive, via a WS service endpoint 108 (e.g., a port of application 104), the request from SOA application 102 and process the request according to business logic defined for the service operation. SOA application 104 can then generate a response message that is transmitted to, and consumed by, SOA application 102.

As part of this message passing process, SOA applications 102 and 104 can each interoperate with an agent 110, 112. Agents 110 and 112 can be configured to identify, based in part on metadata referred to as policy attachment metadata, one or more declarative policy documents (i.e., web service policies or policies) that are to be attached to endpoints 106 and 108 of SOA applications 102 and 104. Each of these policies can include a set of assertions that define security and/or management-related behaviors to be carried out by an attached endpoint (i.e., policy subject). Agents 110 and 112 can then implement the identified policies at runtime of applications 102 and 104 by, e.g., intercepting messages that are outgoing from WS client endpoint 106 or incoming into WS service endpoint 108, and enforcing the policies attached to the endpoints against the incoming/outgoing messages. By way of example, agent 110 can determine that a username/password authentication policy should be attached to WS client endpoint 106, and can therefore enforce the requirement that a username and password be included in all request messages outbound from endpoint 106. If a particular message does not conform to the attached policy, an error can be thrown or some other appropriate action can be taken.

In one set of embodiments, the policies enforced by agents 110 and 112 can be maintained in a central metadata store 114 (as policies 116) and made accessible to agents 110 and 112 via a policy manager component 118. As noted above, each policy 116 can be a declaratively defined document (e.g., an Extensible Markup Language (XML) file) and can include a set of assertions defining security and/or management-related behaviors to be carried out by an attached WS endpoint. Examples of such behaviors include authentication, authorization, message protection/encryption, message logging, and the like. In a particular embodiment, the set of assertions can be expressed using one or more standard World Wide Web Consortium (W3C) specifications, such as WS-Policy, WS-SecurityPolicy, WS-RMPolicy, and/or the like. Alternatively, the set of assertions can be expressed using a proprietary specification or lingo that is translatable into a standard W3C specification. In certain embodiments, new policies can be created or existing policies can be modified/deleted via a user interface that is generated by policy manager 118 and made available to users via one or more policy manager clients 120.

The policy attachment metadata used by agents 110 and 112 to identify which policies should be attached to which WS client/service endpoints can generally be of two types: (1) global policy attachment (GPA) metadata (e.g., 122) that is stored with policies 116 in metadata store 114, and (2) local policy attachment (LPA) metadata (e.g., 124 and 126) that is stored locally with a given SOA application. GPA metadata 122 can comprise one or more metadata files (e.g., XML files) that indirectly associate a policy with a set of WS client/service endpoints by specifying a scope (e.g., domain, server, application, etc.) to which the policy should apply. Thus, for example, if a particular GPA metadata file specifies a policy "P1" and a policy subject scope of "server=S1," that indicates that policy P1 should be attached to all of the WS client/service endpoints hosted by applications running on application server S1. This global attachment mechanism can be useful in large deployments, since it enables a policy to be attached to a multitude of policy subjects in an efficient and consistent manner. Like policies 116, GPA metadata 122 can be defined and updated via a user interface that is generated by policy manager 118 and accessed by policy manager clients 120.

In contrast to GPA metadata 122, LPA metadata 124 and 126 can each comprise one or more metadata files (e.g., XML files) that directly associate a policy with a specific endpoint. For example, LPA metadata 124 can include an LPA metadata file that specifies a policy "P2" and a policy subject "App102Port1" (corresponding to WS client endpoint 106), thereby indicating that policy P2 should be directly attached to endpoint 106. Similarly, LPA metadata 126 can include an LPA metadata file that specifies a policy "P3" and a policy subject "App104Port1" (corresponding to WS service endpoint 108), thereby indicating that policy P3 should be directly attached to endpoint 108. This local attachment mechanism can be useful for application developers when designing SOA applications, as it allows them to set security/management behaviors that will be limited to the specific endpoints they specify (rather than potentially affecting the endpoints of other applications as may be the case with GPA metadata). In various embodiments, LPA metadata such as 124 and 126 can be stored in a location that is local to the WS client/service endpoints that they reference. Accordingly, LPA metadata 124 is depicted in FIG. 1 as being stored locally to SOA application 102, and LPA 126 is depicted in FIG. 1 as being stored locally to SOA application 104.

In certain existing SOA implementations, the processing performed by agents 110 and 112 to determine which policies should be attached to, and thus enforced at, a given policy subject (e.g., WS client endpoint 106 or WS service endpoint 108) is based entirely on the declarative policy—policy subject associations defined in the policy subject's associated GPA and LPA metadata. Accordingly, in these existing implementations, there is no way to dynamically modify which policies will be attached to the policy subject at runtime. Instead, all of the valid policies that are specified via the policy subject's GPA/LPA metadata will necessarily be attached and enforced, regardless of the context in which the policy subject is executed. As noted in the Background section, this can be problematic in scenarios where it may be desirable to attach one policy to a policy subject under one set of runtime conditions, and another, different policy to the same policy subject under another, different set of runtime conditions.

Embodiments of the present invention address the foregoing limitation (and other similar limitations) by supporting a feature referred to herein as conditional policy attachment. With this feature, the list of policies that are associated with a given policy subject via GPA/LPA metadata can be filtered, at runtime of the policy subject, based on the evaluation of conditional expressions known as constraint expressions. Each constraint expression can be associated, or linked, with one or more policy—policy subject associations, and can be dependent on the value of one or more runtime parameters. If a constraint expression that is linked with a particular policy and policy subject is satisfied (e.g., evaluates to true) at runtime of the subject, the policy can be considered attached to the policy subject and processed appropriately (e.g., enforced or advertised). On the other hand, if the constraint expression is not satisfied at runtime of the policy subject, the policy will be not considered attached to the policy subject, and therefore will be ignored. With this approach, policies can be conditionally attached to a policy subject based on the subject's runtime context, rather than being statically attached via policy attachment metadata. As a result, the policy subject can dynamically exhibit different behaviors, without requiring manual modifications to the subject's source code or metadata.

By way of example, assume a first policy "P1" is associated with WS client endpoint 106 of SOA application 102 via a first GPA/LPA metadata file, and a second policy "P2" (distinct from policy P1) is associated with the same endpoint 106 via a second GPA/LPA metadata file. In existing implementations, agent 110 would always attach and enforce both policies P1 and P2 against endpoint 106 at runtime of application 102 (provided that the policies are valid and do not conflict). The only way to change this behavior would be to manually modify the policy attachment metadata files.

With the conditional policy attachment feature described herein, agent 110 may not necessarily attach both policies to endpoint 106 (despite the associations defined in the GPA/LPA metadata). Rather, at runtime of application 102, agent 110 can (in conjunction with a constraints component 128, a runtime policy set component 132, and a runtime context component 136) determine, based on the current runtime environment and the constraint expressions linked with endpoint 106 and policies P1 and P2, whether one, both, or neither of the two policies should be attached to endpoint 106. Agent 110 can then process the policies that should be attached while ignoring the policies that should not be attached.

Similar logic can apply to agent 112 of SOA application 104. For example, assume a third policy "P3" is associated with WS service endpoint 108 of SOA application 104 via a third GPA/LPA metadata file, and a fourth policy "P4" (distinct from policy P3) is associated with the same endpoint 108 via a fourth GPA/LPA metadata file. At runtime of application 104, agent 112 can (in conjunction with a constraints component 130, a runtime policy set component 134, and a runtime context component 138) determine, based on the current runtime environment and the constraint expressions linked with endpoint 108 and policies P3 and P4, whether one, both, or neither of the two policies should be attached to endpoint 108. Agent 112 can then process the policies that should be attached while ignoring the policies that should not be attached.

Additional details regarding the processing that can be performed by agents 110 and 112 (and the other depicted components of system 100) to facilitate conditional policy attachment is provided in the sections below.

It should be appreciated that system 100 of FIG. 1 is illustrative and not intended to limit embodiments of the present invention. For example, the various entities depicted in system 100 can have other capabilities or include other components/sub-components that are not specifically described. One of ordinary skill in the art will recognize many variations, modifications, and alternatives.

Constraint Definition and Setup

As described with respect to FIG. 1, the conditional policy attachment feature of the present invention is based on a constraint model that relies on conditional expressions referred to herein as constraints or constraint expressions. Each constraint expression can be a Boolean expression (i.e., an expression that evaluates to true or false) whose evaluation is dependent on one or more runtime parameters of a web service endpoint, application, and/or server (in other words, parameters that are only available/resolvable at runtime of the endpoint, application, and/or server). Examples of such runtime parameters include transport-level characteristics of an incoming message (e.g., HTTP header information, etc.), payload characteristics of an incoming message (e.g., user identity, message content, etc.), server performance/configuration statistics (e.g., CPU load, memory utilization, number of simultaneous connections, time of day, etc.), and so on. Representations of the constraint expressions, as well as logic for evaluating the constraint expressions in view of a specific runtime context, can be maintained by a constraints component (e.g., 128, 130) that is accessible to each SOA application in a deployment (e.g., 102, 104).

Figure 2:
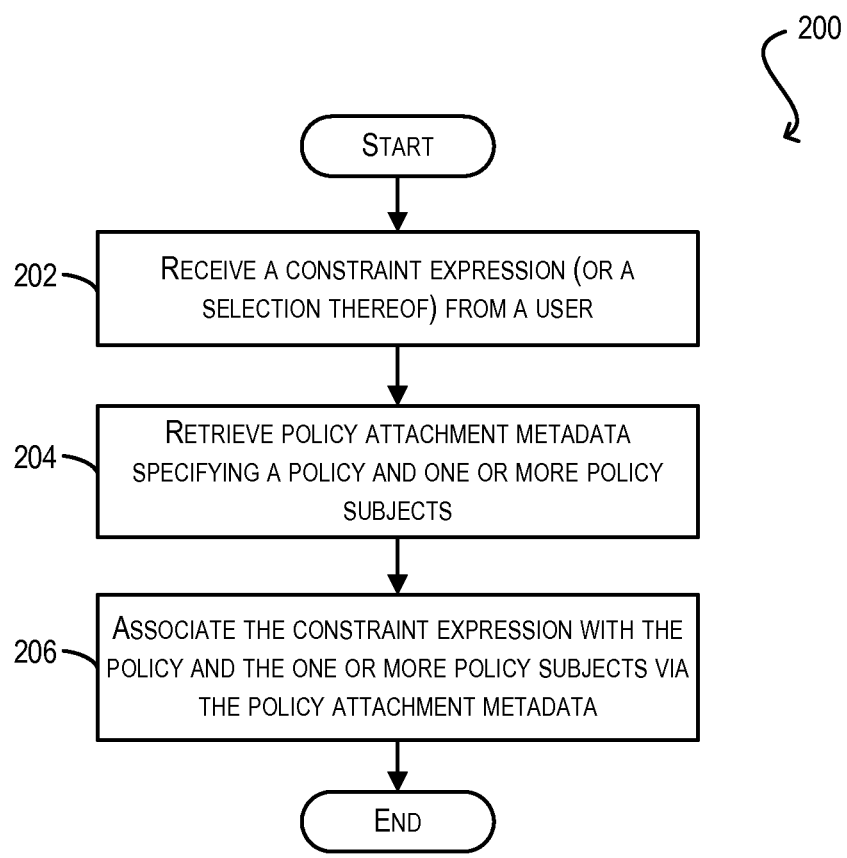
FIG. 2 is a flow diagram of a process for defining and setting up constraint expressions in accordance with an embodiment of the present invention.

In order to utilize constraint expressions for conditional attachment purposes, various embodiments of the present invention allow constraint expressions to be linked to policy—policy subject associations (as defined in GPA/LPA metadata). These linkages can then be referenced at runtime of a policy subject to determine which constraint expression should be evaluated for a given policy. FIG. 2 is a flow diagram of a setup process 200 for defining and linking constraint expressions according to an embodiment of the present invention. In one set of embodiments, process 200 can be performed by policy manager 118 of system 100. In other embodiments, process 200 can be performed by some other component of system 100, such as a centralized constraints manager (not shown) that is in communication with policy manager 118. Process 200 can be implemented in hardware, software, or a combination thereof. As software, process 200 can be implemented as program code that is encoded on a non-transitory computer-readable storage medium.

At block 202, policy manager 118 can receive a definition of a constraint expression (or a selection of an existing constraint expression) from a user of system 100 (e.g., an application developer, a system administrator, a customer, etc.). As noted above, the constraint expression can be a Boolean expression that is dependent on one or more runtime parameters of a web service policy subject (e.g., a web service endpoint). For example, the constraint expression can invoke a function that compares the value of a HTTP header in an incoming service request message to a predefined value. If the HTTP header value matches the predefined value, the function (and thus the constraint expression) can return true. If the HTTP header value does not match the predefined value, the function (and thus the constraint expression) can return false. In various other embodiments, the constraint expression can be dependent on other types of runtime information, such as system configuration or performance statistics (e.g., CPU load, memory utilization, number of simultaneous connections, time of day, etc.), characteristics of a message payload (e.g., user identity, message content, etc.), and more. One of ordinary skill in the art will recognize many other variations and alternatives.

In the HTTP header example above, the constraint expression corresponds to a single function invocation. However, in alternative embodiments, the constraint expression can be considerably more complex. For example, in certain embodiments the constraint expression can comprise a plurality of function calls that are qualified and/or joined by various logical operators (and, or, negation, etc.). The components of the expression can also be grouped using various grouping mechanisms. When the constraint expression is evaluated, the system can take these logical operators and groups into account in order to arrive at a final Boolean result. In one example, the constraint expression can comprise one or more special characters, such as parentheses, to collect functions into a group, and the special characters can increase a precedence level of the group in the expression.

In some embodiments, the constraint expression described with respect to block 202 can be seeded by an application developer. With this approach, a system administrator or end-user of policy manager 118 can simply select from a listing of predefined, seeded constraint expressions. Alternatively, the constraint expression can be newly defined through the policy manager interface. With this approach, end-users have the capability to create new constraint expressions (beyond the constraint expressions contemplated by the application developers) to meet their specific business requirements.

At block 204, policy manager 118 can retrieve policy attachment metadata specifying a policy and one or more policy subjects. This retrieved data can include GPA metadata (e.g., 122) that is retrieved from metadata store 114, and/or LPA metadata (e.g., 124, 126) that is retrieved from one or more application servers. In one set of embodiments, this retrieving can be performed in response to the user of block 202 requesting policy attachment information for the specified policy, for the purpose of linking the constraint expression defined/selected at block 202 with the policy and/or policy subjects.

Once the policy attachment metadata has been retrieved, policy manager 118 can associate the constraint expression with the policy and the one or more policy subjects specified in the policy attachment metadata (block 206). In a particular embodiment, this association can be achieved by modifying the policy attachment metadata (e.g., the GPA or LPA metadata file) to include a reference to the constraint expression. Since the policy attachment metadata already includes references to the policy and the policy subject(s), the addition of this third reference to the policy attachment metadata can effectively link together the constraint expression with the policy and policy subject(s). By linking together these three entities in this manner, the system can be made aware that the policy should only be attached to the policy subject(s) at runtime if the constraint expression is satisfied.

Although not shown in FIG. 2, a single constraint expression can be linked to multiple policy—policy subject associations by adding a reference to the constraint expression to multiple policy attachment metadata files. Further, in other embodiments, multiple constraint expressions can be linked to a single policy—policy subject association by adding references to the multiple constraint expressions to a single policy attachment metadata file.

It should be appreciated that process 200 is illustrative and not intended to limit embodiments of the present invention. Steps described as sequential can be executed in parallel, order of steps can be varied, and steps can be modified, combined, added, or omitted. One of ordinary skill in the art will recognize many variations, modifications, and alternatives.

Figure 3:
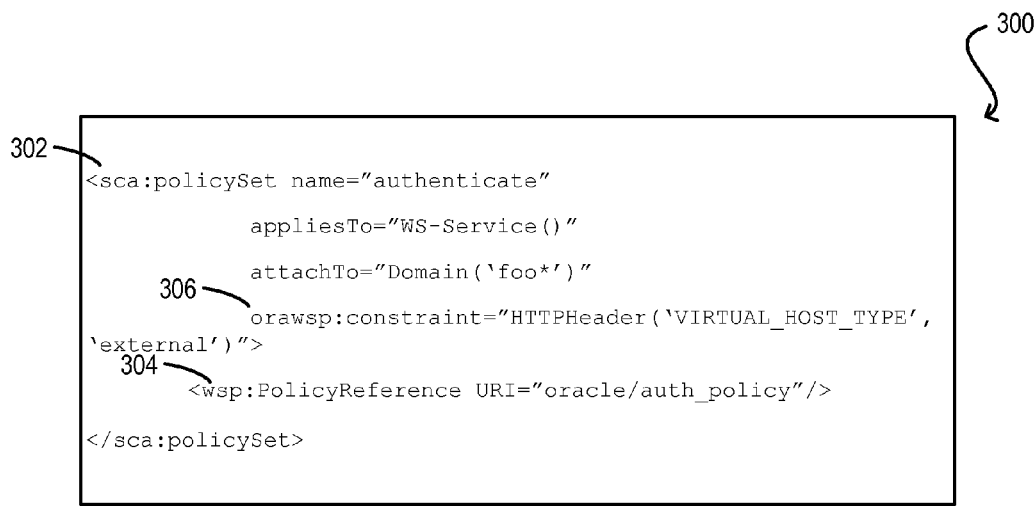
FIG. 3 is an example of a global policy attachment metadata file.

FIG. 3 illustrates an example GPA metadata file 300 that has been modified to include a reference to a constraint expression per the processing of FIG. 2. As shown, GPA metadata file 300 includes a top level "policySet" XML element 302, a nested "PolicyReference" XML element 304, and a "constraint" attribute 306 (defined within the "policySet" element). In various embodiments, policySet and PolicyReference elements 302 and 304 are pre-existing elements of GPA metadata file 300 that define a policy—policy subject association per the global policy attachment mechanism. For example, in the embodiment of FIG. 3, these two elements indicate that all policy subjects of the type "WS-Service" (i.e., WS service endpoints) and within the domain starting with "foo" should be associated with the web service policy identified by the URI "oracle/auth_policy."

Constraint attribute 306 is a reference that has been added to file 300 (as described at block 206 of FIG. 2) in order to link policySet element 302 and PolicyReference element 304 with a constraint expression. In this example, constraint attribute 306 specifies a constraint expression that invokes an "HTTP-Header" function with two parameters: "VIRTUAL_HOST_TYPE" and "external." This particular function can check the VIRTUAL_HOST_TYPE HTTP header of an incoming message and determine whether the header value is equal to "external" (signifying that the message originated from an external, rather than internal, client).

With the addition of constraint attribute 306 to GPA metadata file 300, the semantics of file 300 have been modified to indicate that the policy—policy subject association defined by elements 302 and 304 should only apply (i.e., result in attachment of the policy to the policy subjects) if the constraint expression specified via constraint attribute 306 is satisfied at runtime of the policy subject. Thus, in the embodiment of FIG. 3, the policy identified by the URI "oracle/auth_policy" should only be attached to policy subjects of the type "WS-Service( )" and within the scope of a domain starting with "foo" if an incoming message at the subject is sent from an external client (i.e., VIRTUAL_HOST_TYPE HTTP header=external).

Conditional Policy Identification and Enforcement

Figure 4:
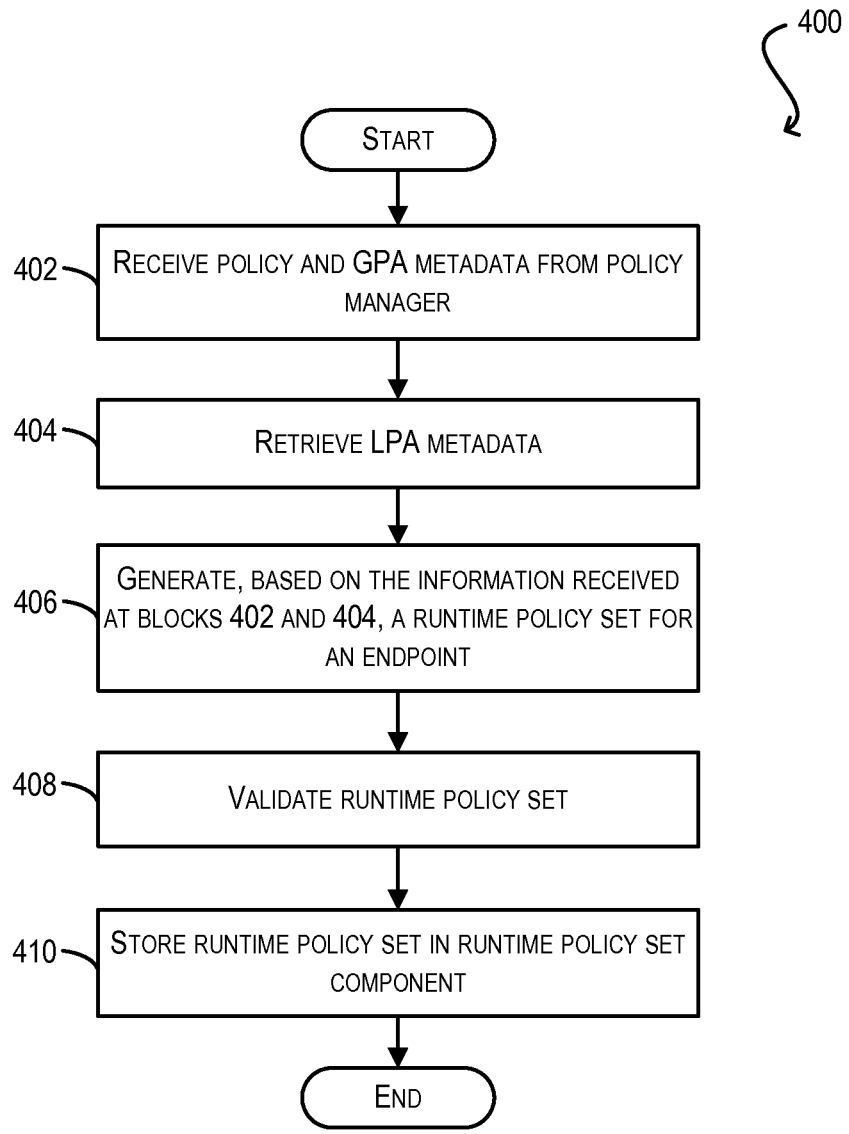
FIG. 4 is a flow diagram of an initialization process performed by an agent of an SOA application to facilitate conditional policy attachment in accordance with an embodiment of present invention.

Once constraint expressions have been defined and linked to policies and policy subjects via policy attachment metadata, these expressions can be identified and evaluated at runtime of a policy subject to conditionally attach policies to, and thus enforce the policies against, the policy subject. FIG. 4 is a flow diagram of a process 400 that can be performed during an initialization phase of an SOA application (e.g., application 102 or 104) to identify policy/constraint information for a policy subject of the application (e.g., WS client endpoint 106 or WS service endpoint 108) according to an embodiment of the present invention. In one set of embodiments, process 400 can be performed by either agent 110 or 112 of system 100. Process 400 can be implemented in hardware, software, or a combination thereof. As software, process 400 can be implemented as program code that is encoded on a non-transitory computer-readable storage medium.

At block 402, agent 110, 112 can receive, from policy manager 118, policy information and GPA metadata information stored in metadata store 114 that is relevant to endpoint 106, 108. For instance, agent 110, 112 can receive all GPA metadata files that associate a policy with a policy subject scope that encompasses endpoint 106, 108. Agent 110, 112 can also retrieve LPA metadata (e.g., 124, 126) that directly references endpoint 106, 108 (block 204).

Figure 5:
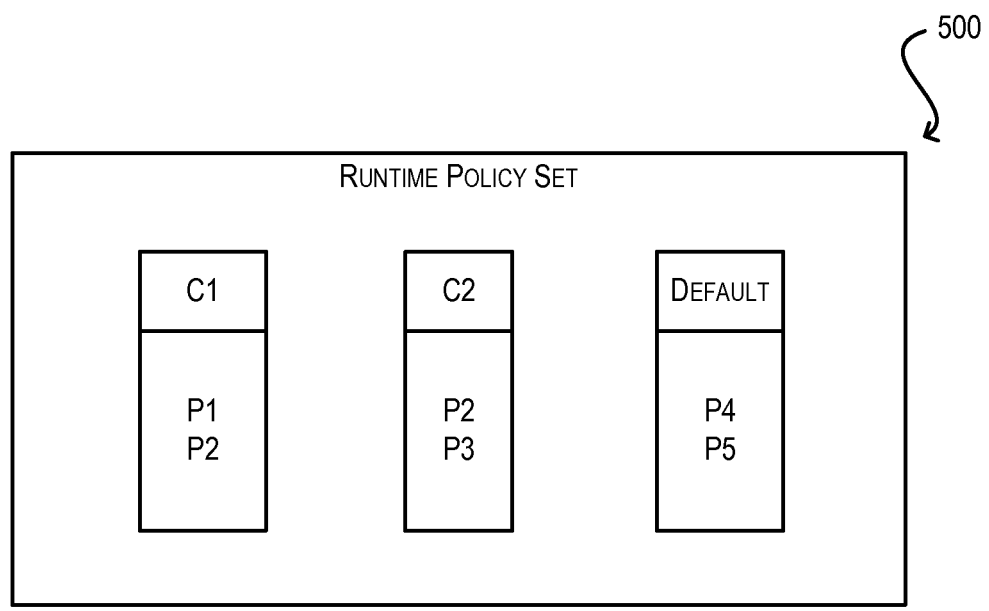
FIG. 5 is a simplified block diagram illustrating a runtime policy set in accordance with an embodiment of the present invention.

At block 406, agent 110, 112 can process the GPA/LPA metadata received at blocks 402 and 404 to generate a "runtime policy set" for endpoint 106, 108. In various embodiments, this runtime policy set can identify all of the policies that may potentially be attached to endpoint 106, 108, along with their linked constraint expressions (as defined in GPA/LPA metadata). Thus, the runtime policy set can encapsulate all of the information agent 110, 112 needs in order to determine which constraints should be evaluated against which policies at runtime of endpoint 106, 108. By way of illustration, FIG. 5 depicts a sample runtime policy set 500 for, e.g., WS client endpoint 106 of application 102. As shown in FIG. 5, runtime policy set 500 includes five policies—P1 through P5—that may by attached to endpoint 106. Policy P1 is grouped under constraint expression C1, thereby indicating that P1 is linked with C1 (and thus should only be attached to endpoint 106 in the event that C1 is satisfied at runtime). Policy P3 is grouped under constraint expression C2, thereby indicating that P3 is linked with C2 (and thus should only be attached to endpoint 106 in the event that C2 is satisfied at runtime). Policy P2 is grouped under constraint expressions C1 and C2, thereby indicating that P2 is linked with both C1 and C2 (and thus should be attached to endpoint 106 in the event that either C1 or C2 is satisfied at runtime). And policies P4 and P5 are grouped under a "Default" category, thereby indicating that these policies are not linked with any constraint expressions (and thus should always be attached to endpoint 106, regardless of the runtime context).

In some embodiments, the process of generating the runtime policy set can include a scope resolution process that automatically excludes from the runtime policy set any policies that are deemed to be inapplicable according to one or more scope precedence rules. This can come into play if, e.g., multiple, conflicting policies are associated with an endpoint at different scope levels (e.g., via different GPA and/or LPA metadata files). For instance, assume a first authentication policy "Auth1" is associated with endpoint 106 via a GPA metadata file defined at "server" scope level that encompasses application 102. Further, assume that a second authentication policy "Auth2" is associated with endpoint 106 via an LPA metadata file that directly references the application port corresponding to endpoint 106. Generally speaking, only one authentication policy (Auth1 or Auth2) can be attached to endpoint 106 at a time. Accordingly, in this situation the scope resolution process can decide, based on one or more predefined rules, which attachment metadata file (e.g., the GPA metadata file or the LPA metadata file) should take precedence over the other. The policy attachment metadata file that takes precedence will have its referenced authentication policy added to the runtime policy set for endpoint 106, while the other policy attachment file will be ignored. A list of precedence rules, as well as additional information regarding this scope resolution mechanism, is described in U.S. patent application Ser. No. 13/118,947 (incorporated by reference above).

Returning to FIG. 4, once the runtime policy set for endpoint 106, 108 has been generated at block 406, agent 110, 112 can validate the runtime policy set to ensure that there are no conflicts or incompatibilities with respect to the policies in the set (block 408). In certain embodiments, this validation process can take into account the possibility that only a portion of the policies in the runtime policy set may actually be attached to endpoint 106, 108 at runtime (depending on which constraint expressions are satisfied). Additional details regarding how this validation can be performed is provided in the section titled "Policy Validation in the Presence of Constraints" below.

At block 410, the generated runtime policy set can be stored in a runtime policy set component accessible to application 102, 104 (e.g., 132, 134, of FIG. 1). As described with respect to FIG. 6, this component can be subsequently used by agent 110, 112 (in conjunction with runtime context component 136, 138 and constraints component 128, 130) to conditionally attach and enforce policies at runtime of endpoint 106, 108.

Figure 6:
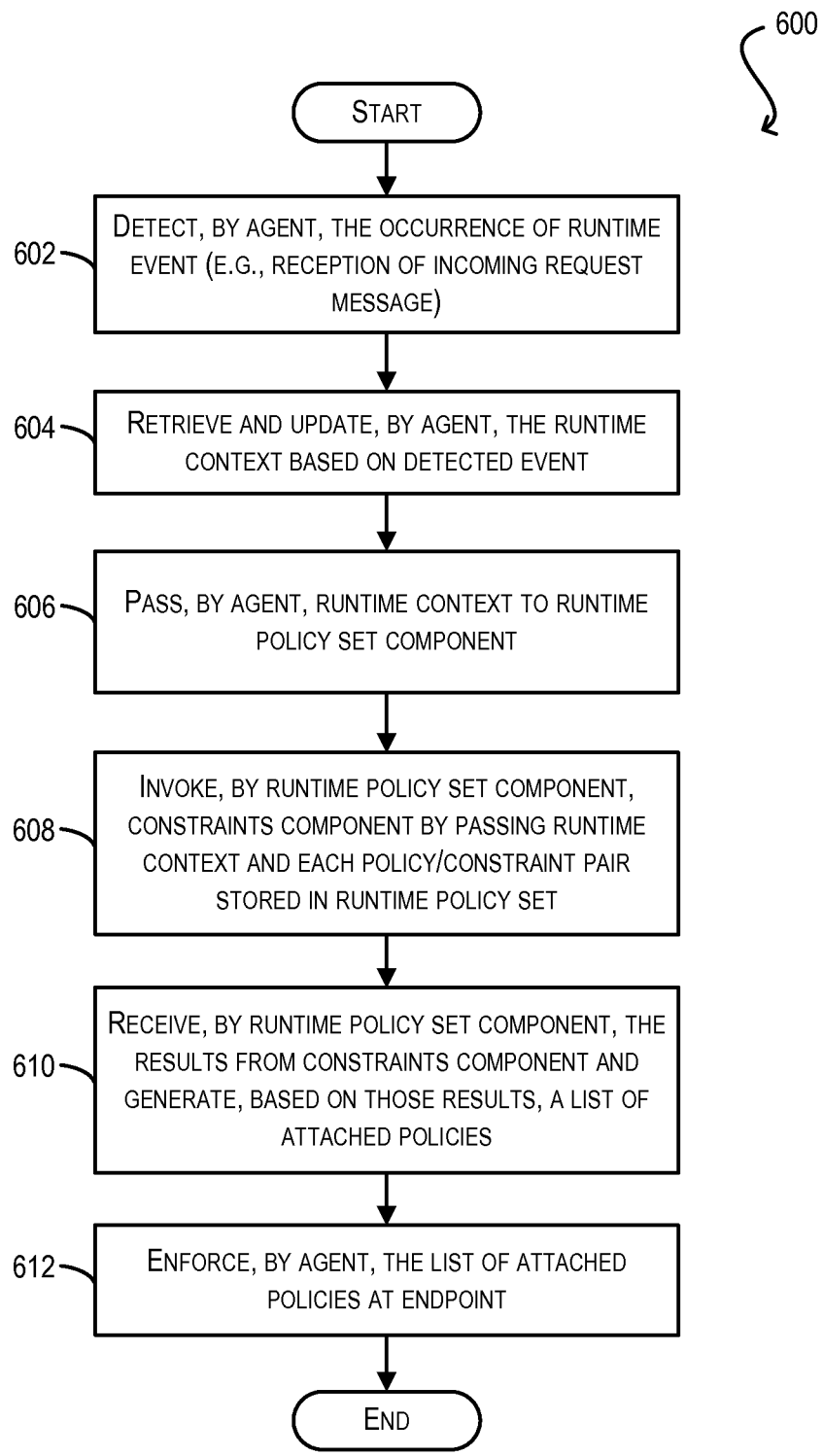
FIG. 6 is a flow diagram of a runtime process performed by an agent of an SOA application for conditionally enforcing policies in accordance with an embodiment of the present invention.

FIG. 6 is a flow diagram of a runtime process 600 for conditionally enforcing policies at a policy subject according to an embodiment of the present invention. In one set of embodiments, process 600 can be performed by either agent 110 or 112 after completing the initialization processing of FIG. 4. Process 600 can be implemented in hardware, software, or a combination thereof. As software, process 600 can be implemented as program code that is encoded on a non-transitory computer-readable storage medium.

At block 602, agent 110, 112 can detect the occurrence of a runtime event at endpoint 106, 108 that requires the agent to consider whether one or more policies need to be enforced at the endpoint. Examples of such runtime events can include the reception of an incoming message, the transmission of an outgoing message, and so on.

At block 604, agent 110, 112 can retrieve runtime context component 136, 138, which is an object that is configured to maintain all (or nearly all) of the knowable information about the current runtime context of endpoint 106, 108. Agent 110, 112 can then update runtime context component 136, 138 with any new information regarding the detected runtime event. For example, assume that the detected event is the reception of an incoming request message. In this case, agent 110, 112 can extract various types of information from the incoming message (e.g., HTTP headers, message sender, message payload, etc.) and store this information in runtime context component 136, 138.

Once runtime context component 136, 138 has been retrieved and updated, agent 110, 112 can pass the runtime context component to runtime policy set component 132, 134 (block 606). As noted with respect to FIG. 4, runtime policy set component 132, 134 is generated during an initialization phase of application 102, 104 and can maintain a list of all of the policies that may potentially be attached to endpoint 106, 108, along with their linked constraint expressions. In response to receiving runtime context component 136, 138, runtime policy set component 132, 134 can traverse its list of policy/constraint expression pairs and, for each pair, invoke constraints component 128, 130 to evaluate the constraint expression against the current runtime context (block 608). For instance, runtime policy set component 132, 134 can pass to constraints component 128, 130 the name of a constraint (e.g., C1), the name of the constraint's linked policy (e.g., P1), and a pointer to runtime context component 136, 138. Constraints component 128, 130 can then retrieve the definition of constraint expression C1, evaluate C1 in view of the runtime values in runtime context component 136, 138, and return an indication to runtime policy set component 132, 134 of whether C1 is satisfied.

At block 610, runtime policy set component 136, 138 can receive the results generated by constraints component 128, 130 for each policy/constraint expression pair, and if the constraint expression for a given pair is satisfied, can add the policy to a list of "attached" policies that should be enforced at endpoint 106, 108. Once all of the policy/constraint expression pairs have been processed by constraints component 128, 130, runtime policy set component 138, 138 can transmit the final list of attached policies to agent 110, 112.

Upon receiving the list of attached policies from runtime policy set component 136, 138, agent 110, 112 can enforce the list of policies at endpoint 106, 108 in view of the runtime event (block 612). This can include, e.g., sequentially accessing each attached policy to determine one or more assertions included in the policy. Each assertion can then be processed to ensure that the assertion is satisfied with respect to the runtime event. For instance, assume that the detected runtime event is the reception of an incoming request message, and that the list of attached policies includes an authentication policy that specifies an assertion requiring a Security Assertion Markup Language (SAML) token. In this scenario, agent 110, 112 can enforce the policy by checking whether a SAML token has been included in the incoming message. If no token is found (thereby indicating that the message does not conform to the attached authentication policy), an error can be thrown. If all of the attached polices can be enforced without error, the incoming message can be processed as appropriate by the business logic layer of SOA application 102, 104.

It should be appreciated that processes 400 and 600 are illustrative and not intended to limit embodiments of the present invention. Steps described as sequential can be executed in parallel, order of steps can be varied, and steps can be modified, combined, added, or omitted. One of ordinary skill in the art will recognize many variations, modifications, and alternatives.

Conditional Policy Advertisement

Generally speaking, when a WS client endpoint wishes to interact with (e.g., send a service request to) a WS service endpoint, the client endpoint needs to know, in advance, the type of policies that are used to secure/manage the service endpoint in order to construct and send an appropriate request message. To facilitate this, existing SOA implementations use an "advertisement" mechanism to communicate, or advertise, security/management requirements from WS services to WS clients.

For example, in a typical advertisement flow, a WS client endpoint will send a Web Service Definition Language (WSDL) request to a WS service endpoint indicating that the client endpoint is interested in all of the security/management requirements enforced by the service endpoint. In response, the WS service endpoint will transmit a WSDL file encapsulating its requirements (as defined by its attached policies) to the client. Upon receiving the WSDL file, the WS client endpoint will use the information in the file to generate an appropriate service request. In existing implementations, the WSDL file transmitted by the WS service endpoint to the WS client endpoint will generally be static, since it is based solely on the policies that are attached to the service endpoint via declarative policy attachment metadata.

With the conditional attachment feature described herein, the polices that are attached to a WS service endpoint can dynamically change as the runtime context of the service endpoint changes. Thus, the security/management requirements to be advertised to inquiring clients will no longer be static; rather, they will also change dynamically as the runtime context changes. To accommodate this, certain embodiments of the present invention can provide a modified advertisement flow that takes into account the conditional attachment of policies to service endpoints and enables the service endpoints to dynamically generate WSDL files accordingly.

Figure 7:
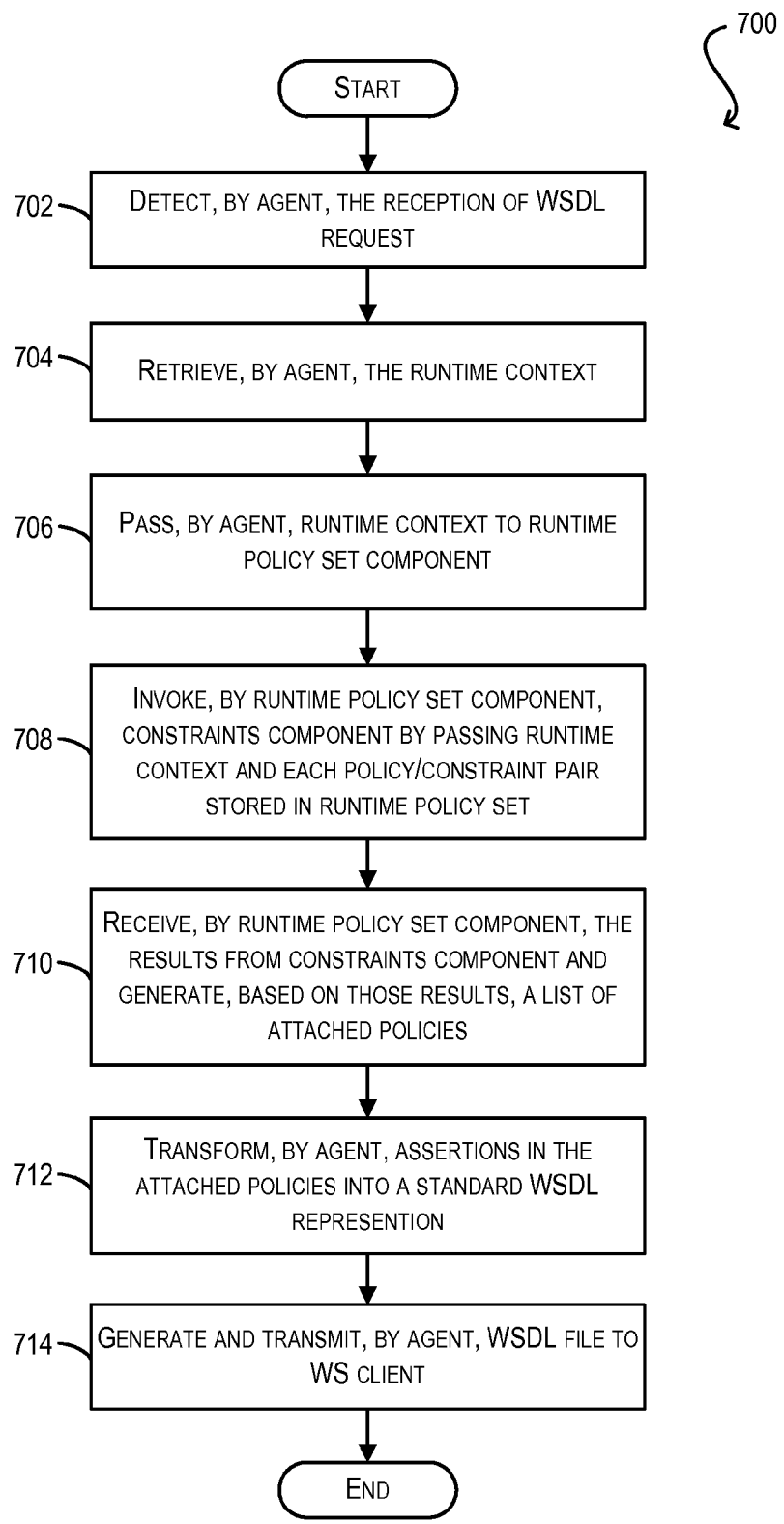
FIG. 7 is a flow diagram of a runtime process performed by an agent of an SOA application for conditionally advertising policies in accordance with an embodiment of the present invention.

FIG. 7 is an example of such a modified flow/process 700 according to an embodiment of the present invention. In one set of embodiments, process 700 can be performed by agent 112 of system 100, subsequent to the initialization processing of FIG. 4. Process 700 can be implemented in hardware, software, or a combination thereof. As software, process 700 can be implemented as program code that is encoded on a non-transitory computer-readable storage medium.

At block 702, agent 112 can detect the reception of a WSDL request at WS service endpoint 108. As noted above, this request can indicate that an originating WS client endpoint (e.g., client endpoint 106) is interested in receiving, in the form of a WSDL file, all of the security/management requirements enforced by WS service endpoint 108. In one set of embodiments, the WSDL request can be initiated by client endpoint 106 by invoking a uniform resource locator (URL) of service endpoint 108 with the parameter "?wsdl" appended to the end.

At block 704, agent 112 can retrieve the runtime context component (138) that was generated during the initialization processing of FIG. 4. Agent 112 can then pass runtime context component 139 to runtime policy set component 134 (block 706). As noted above, runtime policy set component 134 can maintain a list of all of the policies that may potentially be attached to WS service endpoint 108, along with their linked constraint expressions.

In response to receiving runtime context component 138, runtime policy set component 134 can traverse its list of policy/constraint expression pairs and, for each pair, invoke constraints component 130 to evaluate the constraint expression against the current runtime context (block 708). For instance, runtime policy set component 134 can pass to constraints component 130 the name of a constraint (e.g., C1), the name of the constraint's linked policy (e.g., P1), and a pointer to runtime context component 138. Constraints component 130 can then retrieve the definition of constraint expression C1, evaluate C1 in view of the runtime values in runtime context component 138, and return an indication to runtime policy set component 134 of whether C1 is satisfied.

At block 710, runtime policy set component 138 can receive the results generated by constraints component 130 for each policy/constraint expression pair, and if the constraint expression for a given pair is satisfied, can add the policy to a list of attached policies that should be enforced at WS service endpoint 108. Once all of the policy/constraint expression pairs have been processed by constraints component 130, runtime policy set component 138 can transmit the final list of attached policies to agent 112.

Upon receiving the list of attached policies from runtime policy set component 138, agent 112 can process the policies in preparation for advertising the behaviors defined in the policies to WS client endpoint 106. For example, at block 712, agent 112 can sequentially accessing each attached policy to determine one or more assertions included in the policy. Each assertion can then be transformed into a standard WSDL representation (based on, e.g., the WS-SecurityPolicy and WS-Policy/PolicyAttachment standards). Agent 112 can then package the transformed policy assertions into a WSDL file and transmit the WSDL file to WS client endpoint 106 for consumption (block 714).

One distinction between policy enforcement and policy advertisement is that, in the advertisement case, a WS service endpoint does not actually receive a request message (with an associated payload) from a WS client endpoint; rather, the service endpoint merely receives a request for the service's WSDL file. Thus, in certain embodiments, the set of constraints that can be properly resolved in the advertisement case may be smaller. For example, constraints that are dependent on transport-level characteristics of an incoming message (e.g., HTTP header information) or system configuration can be resolved at the time of generating an advertisement, since such information would be included in the WSDL request or would be available from the application server. However, constraints that are dependent on the payload of an incoming service request (e.g., user ID, etc.) may not be resolvable at the time of generating an advertisement, since no request message is actually received.

Although not shown in FIG. 7, in some embodiments agent 112 can maintain a cache of WSDL files that have been generated in response to WSDL requests. This cache can be indexed by a key corresponding to a particular runtime context. In these embodiments, agent 112 can, prior to performing blocks 706-714, check the cache to determine whether a WSDL file has already been generated and cached for the current runtime context. If such a file is found in the cache, agent 112 can simply transmit the cached file to WS client endpoint 106. If such a file is not found in the cache, agent 112 can proceed with determining the list of attached policies and generating a new WSDL file per the processing of blocks 706-714. At block 714, agent 112 can further store the newly generated WSDL file in the cache so that it can be used to satisfy future WSDL requests that are received under the same runtime context as the current request.

It should be appreciated that process 700 is illustrative and not intended to limit embodiments of the present invention. For example, although WSDL is currently the most common language used by a web service to advertise its requirements, other types of languages/specifications may also be supported. Further, steps described as sequential can be executed in parallel, order of steps can be varied, and steps can be modified, combined, added, or omitted. One of ordinary skill in the art will recognize many variations, modifications, and alternatives.

Policy Validation in the Presence of Constraints

As discussed with respect to FIG. 4 above, the initialization process (400) performed by agent 110 or 112 of system 100 to identify policy/constraint information for a particular policy subject can include, at block 408, a validation process that is executed against the runtime policy set generated at block 406. This validation process can ensure that there are no conflicts, incompatibilities, or other errors with respect to the policies that will be attached to the policy subject.

One complication introduced by the conditional policy attachment model is that the actual set of policies that are attached to a policy subject is not determined until runtime. To address this, in certain embodiments the validation process can include grouping the policies that have been associated with the policy subject (via policy attachment metadata) by their corresponding constraint expressions, and determining which groups can potentially overlap (i.e., be simultaneously attached to the policy subject) at runtime. Each set of overlapping groups can then be validated using a predefined set of validation rules to identify potential errors pertaining to the policies in the set. In this manner, only the subsets of policies that may be attached to the policy subject together (in view of their corresponding constraint expressions) will be validated.

By way of example, assume one type of validation rule specifies that only a single authentication policy can be attached to a policy subject at a time. If two authentication policies associated with the policy subject are grouped together (i.e., linked with the same constraint expression) or grouped in overlapping groups, it can be inferred that the two policies will be attached (or will not be attached) together. Accordingly, the validation rule can be applied to these two policies, and a validation result indicated a conflict can be generated. In contrast, if the two policies are not grouped together or in overlapping groups (e.g., the two policies are linked with mutually exclusive constraint expressions), it can be inferred that the two policies will never be enforced together, and thus there is no need to validate this policy subset.

In certain embodiments, no error is thrown if a validation error is found for a particular policy subset, since that subset may not be enforced at the policy subject at runtime (depending on the runtime context). Instead, information regarding the error can be provided to a system administrator for review, or can be stored for later use/processing.

Figure 8:
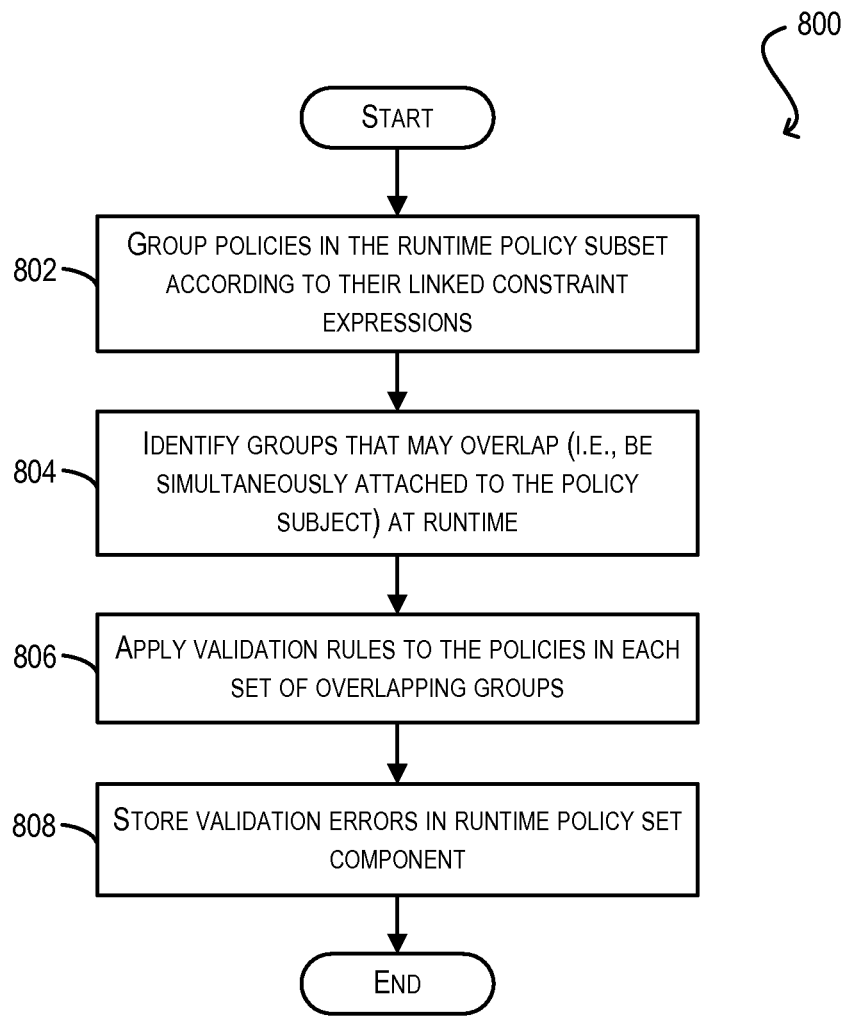
FIG. 8 is a flow diagram of an initialization process performed by an agent of an SOA application for validating policies in accordance with an embodiment of the present invention.

FIG. 8 is a flow diagram of a process 800 for validating policies according to an embodiment of the present invention. In one set of embodiments, process 800 can be performed by agent 110 or 112 of system 100 as part of the processing of block 408 of FIG. 4. Process 800 can be implemented in hardware, software, or a combination thereof. As software, process 800 can be implemented as program code that is encoded on a non-transitory computer-readable storage medium.

At block 802, agent 110, 112 can group the policies included in the runtime policy set generated at block 406 of FIG. 4 according to the policies' linked constraint expressions. For example, assume that the runtime policy set includes the following policy/constraint expression pairs—P1/C1, P2/C1, P2/C2, P3/C2. Further, assume that the runtime policy set further includes policies P4 and P5, which are not linked with any constraint expression. In this case, policies P1 and P2 can be grouped under constraint expression C1, P2 and P3 can be grouped under constraint expression P2, and P4 and P5 can be grouped under a "Default" category. This grouping is shown in runtime policy set 500 of FIG. 5.

At block 804, agent 110, 112 can identify, among the groups created at block 802, those groups that can overlap (i.e., be simultaneously be attached to endpoint 106, 108) at runtime. This identification process can include, e.g., analyzing the constraint expressions for the various groups and determining whether the constraint expressions can (or cannot) be satisfied with respect to a single runtime context. For instance, in the example above, assume that constraint expression C1 returns true if an incoming message originates from an external client (and false otherwise), and constraint expression C2 returns true if an incoming message originates from an internal client (and false otherwise). Since constraint expressions C1 and C2 are mutually exclusive (i.e., they will be never be satisfied under an single runtime context), the policy groups associated with C1 and C2 can be identified as non-overlapping groups. On the other hand, the groups associated with C1 and the Default category will overlap, because the policies in the Default group (P4 and P5) are not linked with any constraint expression and thus will always be attached under any runtime context. Similarly, the policy groups associated with C2 and the Default category will overlap.

At block 806, one or more validation rules can be applied to the policies in each set of overlapping groups. In certain embodiments, this can include parsing each policy to determine the assertions included in the policy, and then applying the validation rules against each assertion. Examples of such validation rules include, e.g., rules that limit certain policies to certain types of policy subjects (e.g., WS client or service endpoints), rules that limit certain policies to certain types of web service stacks, rules that limit the ordering of certain policies, rules that indicate certain policy types are incompatible (and thus cannot be attached together), and the like. Many other types of validations may also be applied and contemplated to be within the scope of the present invention.

In one set of embodiments, the validation rules can be predefined and seeded by an application developer. In other embodiments, the validation rules can be created or updated by an end-user of system 100 (e.g., a system administrator or customer). Accordingly, end-users can have the capability to customize the validation process to meet their specific business requirements.

Once the validation rules have been applied, at block 808 the results of that processing (e.g., validation errors) can be stored in runtime policy set component 132, 134. This information can then be made available to a system administrator for review, or maintained in runtime policy set component 132, 134 for later use (e.g., generating a runtime error). In various embodiments, no error is thrown within the context of validation process 800 if a validation error is found for a particular policy subset, since that subset may not be enforced at the policy subject at runtime (depending on the runtime context).

It should be appreciated that process 800 is illustrative and not intended to limit embodiments of the present invention. For example, although process 800 is typically performed by agent 110, 112 upon initialization of the agent's corresponding SOA application, process 800 can also be performed in other contexts, such as at the time of defining GPA and/or LPA metadata through policy manager 118. Further, steps described as sequential can be executed in parallel, order of steps can be varied, and steps can be modified, combined, added, or omitted. One of ordinary skill in the art will recognize many variations, modifications, and alternatives.

Computer System Embodiments

Figure 9:
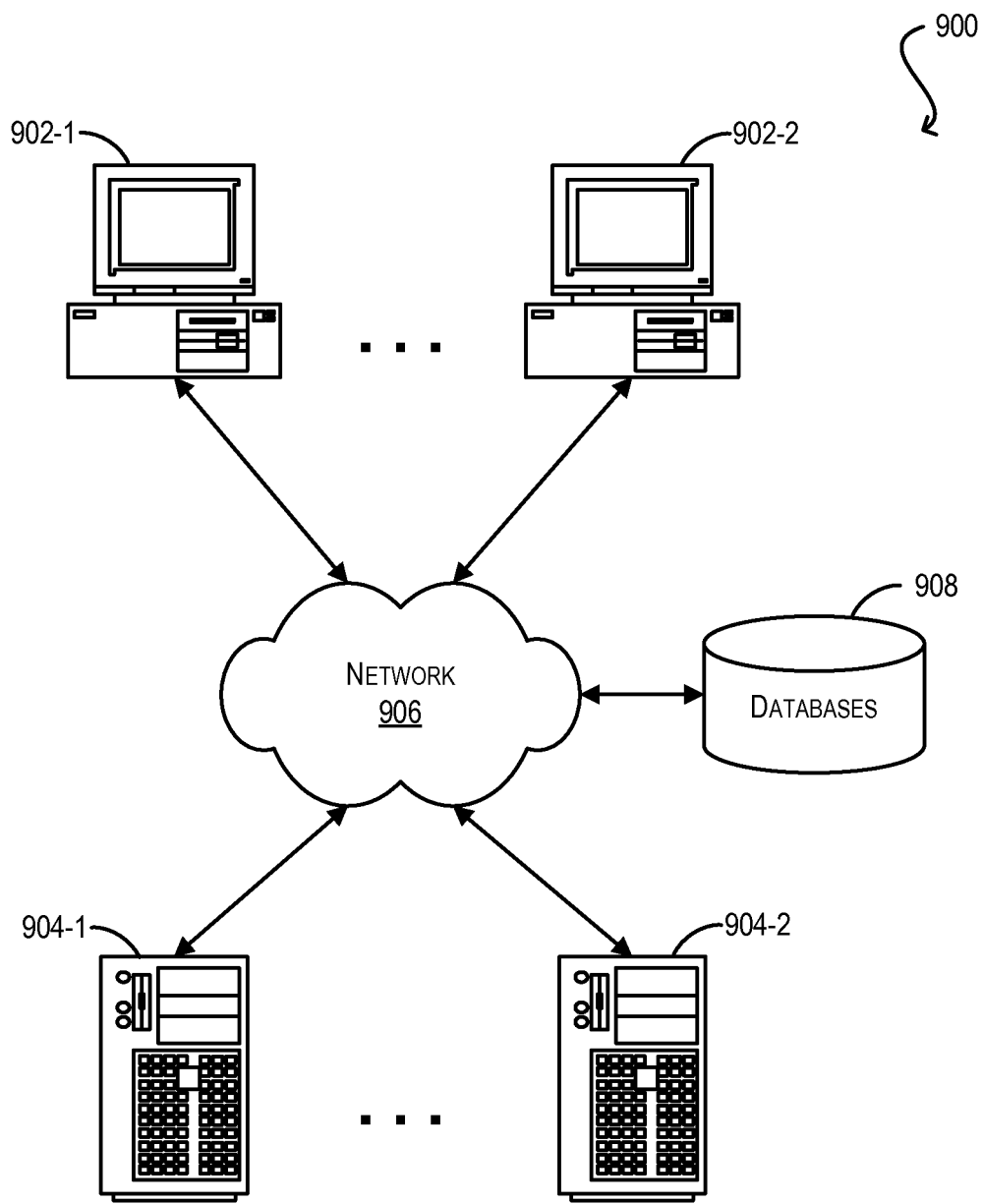
FIG. 9 is a simplified block diagram of a system environment in accordance with an embodiment of the present invention.

FIG. 9 is a simplified block diagram of a system environment 900 that can be used in accordance with an embodiment of the present invention. As shown, system environment 900 can include one or more client computing devices 902-1 and 902-2, which can be configured to operate a client application such as a web browser, a UNIX/Solaris terminal application, and/or the like. In various embodiments, client computing devices 902-1, 902-2 can correspond to policy manager clients 120 of FIG. 1, and can be operated by one or more users to interact with policy manager 118.

Client computing devices 902-1, 902-2 can be general purpose personal computers (e.g., personal computers and/or laptop computers running various versions of Microsoft Windows and/or Apple Mac OSX operating systems), cell phones or PDAs (running software such as Apple iOS, Google Android, or the like and being Internet, e-mail, SMS, or other communication protocol enabled), and/or workstation computers running any of a variety of commercially-available UNIX or UNIX-like operating systems (including without limitation the variety of GNU/Linux operating systems). Alternatively, client computing devices 902-1, 902-2 can be any other electronic device capable of communicating over a network, such as network 906 described below. Although system environment 900 is shown with two client computing devices, it should be appreciated that any number of client computing devices can be supported.

System environment 900 can further include a network 906. Network 906 can be any type of network familiar to those skilled in the art that can support data communications using a network protocol, such as TCP/IP, SNA, IPX, Apple-Talk, and the like. Merely by way of example, network 906 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11, suite of protocols, the Bluetooth protocol known in the art, and/or any other wireless protocol); and/or any combination of these and/or other networks.

System environment 900 can further include one or more server computers 904-1 and 904-2, which can be general purpose computers, specialized server computers (including, e.g., PC servers, UNIX servers, mid-range servers, mainframe computers, rack-mounted servers, etc.), server farms, server clusters, or any other appropriate arrangement and/or combination. Servers 904-1, 904-2 can run an operating system including any of those discussed above, as well as any commercially available server operating system. Servers 904-1, 904-2 can also run any of a variety of server applications and/or mid-tier applications, including web servers, FTP servers, CGI servers, Java virtual machines, and the like. In one set of embodiments, servers 904-1, 904-2 can each run an application server that is configured to provide an execution environment for SOA application 102, SOA application 104, and/or policy manager 118 of FIG. 1.

System environment 900 can further include one or more databases 908. In one set of embodiments, databases 908 can include databases that are managed by one or more of servers 904-1, 904-2. In a particular embodiment, databases 908 can be configured to store information maintained in metadata store 114 of FIG. 1. Databases 908 can reside in a variety of locations. By way of example, databases 908 can reside on a storage medium local to (and/or resident in) one or more of computers 902-1, 902-2, 904-1, 904-2. Alternatively, databases 908 can be remote from any or all of computers 902-1, 902-2, 904-1, 904-2, and/or in communication (e.g., via network 906) with one or more of these. In one set of embodiments, databases 908 can reside in a storage-area network (SAN) familiar to those skilled in the art.

Figure 10:
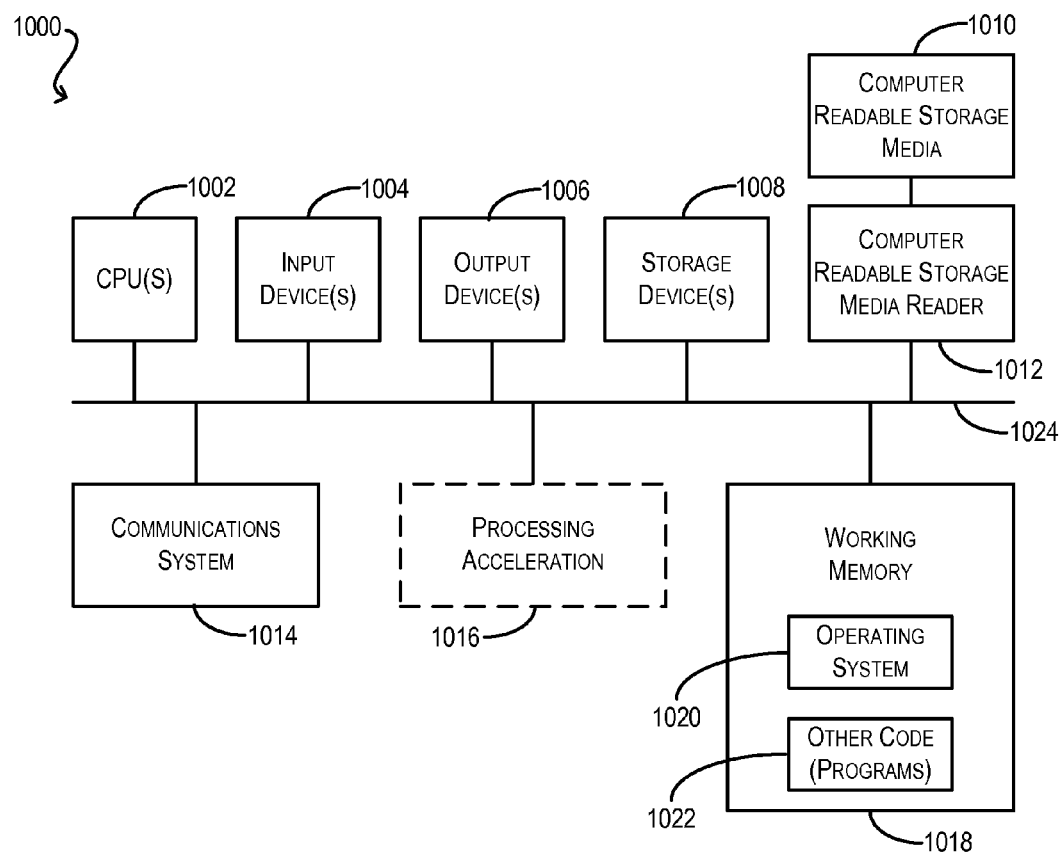
FIG. 10 is a simplified block diagram of a computer system in accordance with an embodiment of the present invention.

FIG. 10 is a simplified block diagram illustrating a computer system 1000 that can be used in accordance with an embodiment of the present invention. In various embodiments, computer system 1000 can be used to implement any of computers 902-1, 902-2, 904-1, 904-2 described with respect to system environment 900 above. As shown, computer system 1000 can include hardware elements that are electrically coupled via a bus 1024. The hardware elements can include one or more central processing units (CPUs) 1002, one or more input devices 1004 (e.g., a mouse, a keyboard, etc.), and one or more output devices 1006 (e.g., a display device, a printer, etc.). Computer system 1000 can also include one or more storage devices 1008. By way of example, the storage device(s) 1008 can include devices such as disk drives, optical storage devices, and solid-state storage devices such as a random access memory (RAM) and/or a read-only memory (ROM), which can be programmable, flash-updateable and/or the like.

Computer system 1000 can additionally include a computer-readable storage media reader 1012, a communications subsystem 1014 (e.g., a modem, a network card (wireless or wired), an infra-red communication device, etc.), and working memory 1018, which can include RAM and ROM devices as described above. In some embodiments, computer system 1000 can also include a processing acceleration unit 1016, which can include a digital signal processor (DSP), a special-purpose processor, and/or the like.

Computer-readable storage media reader 1012 can be connected to a computer-readable storage medium 1010, together (and, optionally, in combination with storage device(s) 1008) comprehensively representing remote, local, fixed, and/or removable storage devices plus storage media for temporarily and/or more permanently containing computer-readable information. Communications system 1014 can permit data to be exchanged with network 906 and/or any other computer described above with respect to system environment 900.

Computer system 1000 can also comprise software elements, shown as being currently located within working memory 1018, including an operating system 1020 and/or other code 1022, such as an application program (which may be a client application, Web browser, middle tier/server application, etc.). It should be appreciated that alternative embodiments of computer system 1000 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 1000 can include any appropriate media known or used in the art, such as but not limited to volatile/non-volatile and removable/non-removable media.

Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, and any other non-transitory medium that can be used to store data and/or program code and that can be accessed by a computer.

Although specific embodiments of the invention have been described above, various modifications, alterations, alternative constructions, and equivalents are within the scope of the invention. For example, although embodiments of the present invention have been described with respect to certain process flows and steps, it should be apparent to those skilled in the art that the scope of the present invention is not limited to the described flows/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:

detecting, by a computer system, occurrence at a web service endpoint of a runtime event;

updating, by the computer system, a runtime context component maintained for the web service endpoint based on the runtime event prior to evaluating one or more policies with respect to the web service endpoint and the runtime event, the runtime context component specifying a set of data regarding a current context within a runtime environment of the web service endpoint that includes information relevant to the runtime event;

identifying, by the computer system, a web service policy whose metadata indicates attachment to the web service endpoint;

determining, by the computer system, whether the web service policy is to be attached to the web service endpoint using the runtime context component and a constraint expression associated with web service policy being dependent on one or more runtime values specified by the runtime context component, the determining comprising evaluating the constraint expression in view of the one or more runtime values specified by the runtime context component;

enforcing, by the computer system, the web service policy at the web service endpoint with respect to the detected runtime event when the web service policy is determined to be attached to the web service endpoint based on satisfying the constraint expression; and ignoring, by the computer system, the metadata indicating attachment of the web service policy at the web service endpoint when the web service policy is determined not to be attached to the web service endpoint based on failing to satisfying the constraint expression.

2. The method of claim 1 wherein the runtime event is the reception of an incoming message at the web service endpoint.

3. The method of claim 2 wherein updating the runtime context component comprises:

extracting one or more pieces of data from the incoming message; and updating the runtime context component with the extracted pieces of data.

4. The method of claim 3 wherein the one or more pieces of data include an HTTP header of the incoming message, and identification of a sender of the incoming message, or a portion of a payload of the incoming message.

5. The method of claim 2 wherein the one or more runtime values include a transport-level characteristic of the incoming message, a payload characteristic of the incoming message, or a system-level characteristic of an application server hosting the web service endpoint.

6. The method of claim 5 wherein a transport-level characteristic of the incoming message includes an HTTP header of the incoming message.

7. The method of claim 5 wherein a payload characteristic of the incoming message includes an identification of a user associated with the incoming message.

8. The method of claim 5 wherein a system-level characteristic of the application server includes a server performance metric.

9. The method of claim 1 wherein the constraint expression is a Boolean expression comprising a set of one or more Boolean functions grouped by zero or more logical operators.

10. The method of claim 1 wherein the web service policy comprises a set of assertions, and wherein enforcing the web service policy comprises enforcing each assertion in the set of assertions.

11. The method of claim 10 wherein the set of assertions relates to security or management-related behaviors of the web service endpoint.

12. The method of claim 11 wherein at least one assertion in the set of assertions relates to user authentication at the web service endpoint.

13. The method of claim 1 wherein the web service endpoint corresponds to a port of a Service-Oriented Architecture (SOA) application.

14. A non-transitory computer-readable medium having stored thereon program code executable by a computer system, the program code comprising:

code that causes the computer system to detect occurrence at a web service endpoint of a runtime event;

code that causes the computer system to update a runtime context component maintained for the web service endpoint based on the runtime event prior to evaluating one or more policies with respect to the web service endpoint and the runtime event, the runtime context component specifying a set of data regarding a current context within a runtime environment of the web service endpoint that includes information relevant to the runtime event;

code that causes the computer system to identifying a web service policy whose metadata indicates attachment to the web service endpoint;

code that causes the computer system to determine whether the web service policy is to be attached to the web service endpoint using the runtime context component and a constraint expression associated with web service policy being dependent on one or more runtime values specified by the runtime context component, the determining comprising evaluating the constraint expression in view of the one or more runtime values specified by the runtime context component;

code that causes the computer system to enforce the web service policy at the web service endpoint with respect to the detected runtime event when the web service policy is determined to be attached to the web service endpoint based on satisfying the constraint expression; and code that causes the computer system to ignore the metadata indicating attachment of the web service policy at the web service endpoint when the web service policy is determined not to be attached to the web service endpoint based on failing to satisfying the constraint expression.

15. The non-transitory computer readable medium of claim 14 wherein the code that causes the computer system to update the runtime context component maintained for the web service endpoint comprises:

code that causes the computer system to receive an incoming message;

code that causes the computer system to extract one or more pieces of data from the incoming message, the one or more pieces of data associated with an HTTP header of the incoming message, identification of a sender of the incoming message, a portion of a payload of the incoming message, transport-level characteristic of the incoming message, or a payload characteristic of the incoming message; and updating the runtime context component with the extracted pieces of data and a system-level characteristic of an application server hosting the web service endpoint.

16. The non-transitory computer readable medium of claim 14 further comprising code that causes the computer system to receive the constraint expression as a Boolean expression comprising a set of one or more Boolean functions grouped by zero or more logical operators.

17. The non-transitory computer readable medium of claim 14 further comprising code that causes the computer system to enforcing each assertion in a set of assertions specified within the web service policy.

18. The non-transitory computer readable medium of claim 17 wherein the set of assertions relates to security or management-related behaviors of the web service endpoint or user authentication at the web service endpoint.

19. A system comprising:
a hardware processor; and
a non-transitory memory storing a set of instructions which when executed by the processor configure the processor to:
  detect occurrence at a web service endpoint of a runtime event;
  update a runtime context component maintained for the web service endpoint based on the runtime event prior to evaluating one or more policies with respect to the web service endpoint and the runtime event, the runtime context component specifying a set of data regarding a current context within a runtime environment of the web service endpoint that includes information relevant to the runtime event;
  identify a web service policy whose metadata indicates attachment to the web service endpoint;
  determine whether the web service policy is to be attached to the web service endpoint using the runtime context component and a constraint expression associated with web service policy being dependent on one or more runtime values specified by the runtime context component, the determining comprising evaluating the constraint expression in view of the one or more runtime values specified by the runtime context component;
  enforce the web service policy at the web service endpoint with respect to the detected runtime event when the web service policy is determined to be attached to the web service endpoint based on satisfying the constraint expression; and
  ignore the metadata indicating attachment of the web service policy at the web service endpoint when the web service policy is determined not to be attached to the web service endpoint based on failing to satisfying the constraint expression.

* * * * *

UNITED STATES PATENT AND TRADEMARK OFFICE
CERTIFICATE OF CORRECTION

| | | |
|---|---|---|
| PATENT NO. | : 9,003,478 B2 | Page 1 of 1 |
| APPLICATION NO. | : 13/596545 | |
| DATED | : April 7, 2015 | |
| INVENTOR(S) | : Kavantzas et al. | |

It is certified that error appears in the above-identified patent and that said Letters Patent is hereby corrected as shown below:

In the Specification

In column 19, line 40-52, delete "Windows and/or Apple Mac. . . .can be supported." and insert the same on Col. 19, line 39, as a continuation of the same paragraph.

Signed and Sealed this
Third Day of November, 2015

Michelle K. Lee
*Director of the United States Patent and Trademark Office*